Oct. 14, 1952 W. P. E. SMITH 2,613,756
AUTOMATIC ENGINE CUTOFF FOR TRACTORS
Filed Dec. 17, 1948
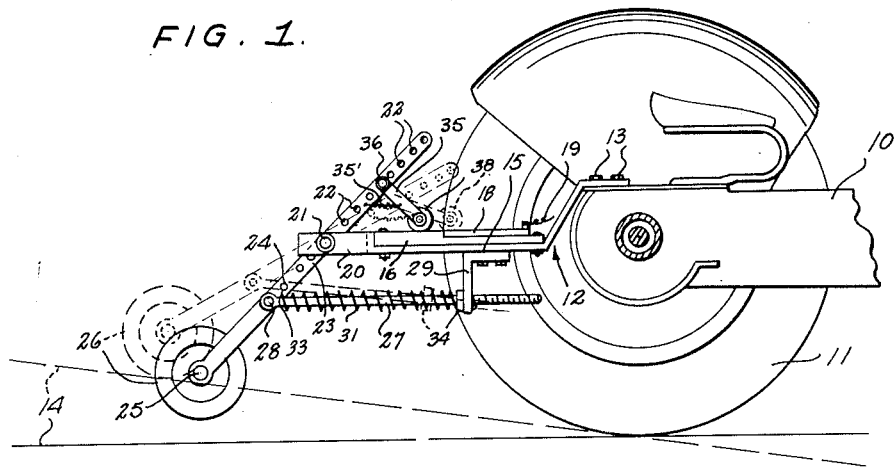
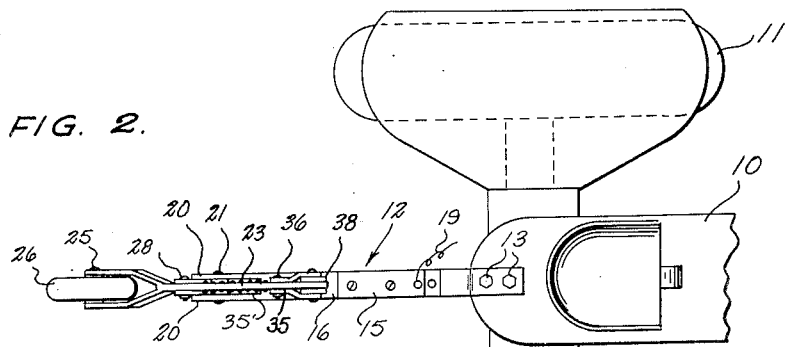
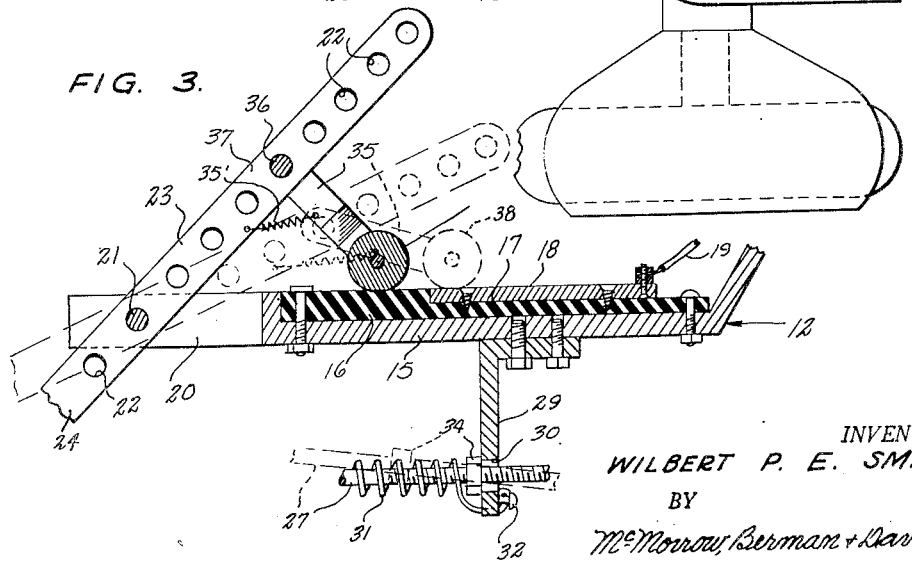
INVENTOR.
WILBERT P. E. SMITH,
BY
McMorrow, Berman & Davidson
ATTORNEYS.

Patented Oct. 14, 1952

2,613,756

UNITED STATES PATENT OFFICE 2,613,756

AUTOMATIC ENGINE CUTOFF FOR TRACTORS

Wilbert P. E. Smith, Thomaston, Conn.

Application December 17, 1948, Serial No. 65,882

5 Claims. (Cl. 180—82)

My invention relates to automatic cut-offs for tractors and the like, and more particularly to such cut-offs as are adapted to operate upon the elevation of the front end of the tractor when the same is pulling a heavy load to prevent the tractor from pulling itself over backward.

With the foregoing in view, it is an object of my invention to provide improved means for cutting off the engine of a tractor upon elevation of the front end thereof.

A further object is to provide an improved means for cutting off the engine of a tractor upon elevation of the front end thereof, which comprises means engageable with the ground upon a predetermined elevation of the tractor front end and means operatively associated with such means for short-circuiting the ignition circuit of the tractor whereby to stop the tractor engine and permit the front end to return to the ground.

Other objects and advantages reside in the particular structure of the invention, combination and arrangement of the several parts thereof, and will be readily understood by those skilled in the art upon reference to the attached drawing in connection with the following specification, wherein the invention is shown, described and claimed.

In the drawing:

Figure 1 is a fragmentary longitudinal vertical sectional view through the rear end of a typical tractor showing the device according to the invention applied thereto, the device being shown in elevation;

Figure 2 is a plan view of Figure 1;

Figure 3 is a fragmentary longitudinal vertical sectional view on an enlarged scale and showing structural details of the device according to the invention.

Referring to the drawing, wherein like reference characters have been used throughout the several views to designate like parts, 10 designates the frame of any suitable tractor which includes any suitable rear running gear or wheels 11. The device according to the invention comprises a bracket generally indicated at 12 which is electrically conductively secured to the frame 10 by any suitable means, such as the screws or bolts 13. The bracket 12 is formed of electric current-conducting material and extends rearwardly of the tractor frame a substantial distance in vertically-spaced relation to the ground surface 14. The upper surface of an intermediate portion 15 of the bracket 12 has secured thereto in any suitable manner a block of insulating material 16. The upper surface of the insulating body 16 is recessed, as at 17, Figure 3, and such recess has seated therein a stationary contact plate 18 of electric current-conducting material. The plate 18 is so disposed that the top surface thereof lies substantially flush with the top surface of the insulating body 16, and it should be noted that the insulating body 16 extends rearwardly of the plate 18 a substantial distance. The forward portion of the contact plate 18 is connected to the tractor's ignition system, not shown, by any suitable electric lead 19. The connection of the lead 19 with the ignition system is such that if the contact plate 18 is grounded to the tractor frame 10, the ignition circuit will be short circuited whereby to stop the tractor motor.

The rear end of the bracket 12 is bifurcated to provide a pair of laterally-spaced bifurcations 20 which are spanned by a removable pivot pin 21 insertable in any of a plurality of longitudinally-spaced holes 22 in a movable contact arm 23. The contact arm 23 includes a lower portion 24 extending below the bracket 12 and includes a lower end formed with a horizontal pivot or the like 25 for a ground-engaging wheel 26. As clearly shown in Figure 1, the ground-engaging wheel 26 is normally vertically spaced from the surface 14 of the ground. By removing the pivot 21 and re-inserting it in a hole 22 above or below the same, the arm is adjustable longitudinally so as to position the wheel above or below the position shown relative to the surface of the ground 14. A guide rod 27 is pivoted to the lower portion 24 of the arm 23 below the bracket 12. Any suitable pivot means 28 serves to connect the rod 27 to the lower portion of the contact arm. A rod guide 29 is fixed to the under surface of the bracket 12 and depends therefrom. The rod guide 29 is provided with a longitudinally-directed, over-sized hole 30 whereby to slidably and pivotally receive a forward portion of the guide rod 27 therein. A contractile coil spring 31 surrounds the guide rod 27 and the forward end of the spring is secured in any suitable manner as at 32, to the rod guide 29. The rear end of the spring 31 is secured in any suitable manner, as at 33, to the lower portion 24 of the contact arm 23. Thus, the spring 31 loads the lower portion 24 of the arm 23 for downwardly swinging movement toward the surface 14 of the ground. To maintain the wheel 26 in vertically-spaced relation to the surface 14, and also to provide means for adjusting the spacing of the wheel 26 and surface 14, there has been provided an adjustable stop 34 best seen in Figure 3. The stop 34 may comprise a nut threaded on the forward end of the guide rod 27 and forced into bearing engagement with the rod guide 29 to limit downward pivotal movement of the lower portion 24 of the contact arm.

A contact member 35 is pivoted by any suitable removable pivot 36 to an upper portion 37 of the contact arm 23. The pivot 36 is insertable in one of the holes 22 of the contact arm whereby to provide means for adjusting the contact member 35 longitudinally of the contact arm. The lower end of the contact member 35 may be bifurcated and have pivotally secured thereto a rollable contact 38. As clearly seen in Figures 1 and 3, the contact member 35 is downwardly pivoted by a spring 35' so as to normally rest atop the insulating body 16 rearwardly of the stationary contact plate 18. However, when the surface 14 of the ground is engaged by the wheel 26 upon upward movement of the front end of the tractor, the contact arm lower portion is pivoted upwardly whereby the contact member and the roller 37 are moved forwardly to the broken line positions, Figure 1, so that the rollable contact 38 engages the stationary contact plate 18. Thus, the ignition system is short circuited by the flow of electric current through the contact 38, contact member 35, contact arm 23 and bracket 12 to the tractor frame 10. The effect of this short circuiting is, of course, to stop the tractor motor whereby the front end of the tractor returns to the ground. At the same time, the spring 31, assisted by gravity pivots the lower portion of the contact arm downwardly to the limit defined by the stop 34, whereby the contact member 35 and rollable contact 38 are moved rearwardly so as to be again positioned atop the insulating body 16. Thus, the ignition circuit is restored to normal and the motor of the tractor may be readily started.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. An attachment for a tractor for short circuiting the ignition system of the same upon elevation of the tractor front end, comprising a current-conducting bracket electrically connected to the rear end of the tractor, a body of insulating material secured atop said bracket, a stationary contact plate secured atop said body in insulated relation to said bracket, means electrically connecting said plate to said ignition system, said bracket including a bifurcated rear end providing a pair of laterally-spaced furcations, a movable contact arm including front and rear ends, current-conducting pivot means pivotally connecting an intermediate portion of said arm to said bracket between said furcations for swinging movement in a vertical plane, a forwardly-directed rod pivoted to a lower portion of said arm below said bracket, a rod guide depending from said bracket and slidably and pivotally receiving said rod, spring means connecting said rod guide and arm to load the lower portion of the latter for downward pivoting movement, a stop adjustable along said rod and engageable with said rod guide to limit downward pivoting of the lower portion of said arm to a selected degree, said arm including a free lower end located in a selected spaced relation to the ground, said arm including an upper portion above said bracket, a contact member pivoted to said upper portion and depending therefrom, said contact member normally bearing against said body of insulating material rearwardly of said stationary contact plate, and said lower end of said arm being engageable with the ground upon predetermined elevation of the front end of the tractor whereby to pivot said lower portion of said arm upwardly and move said contact member into engagement with said stationary contact plate so as to short circuit said ignition system.

2. An attachment for a tractor for short circuiting the ignition system of the same upon elevation of the tractor front end, comprising a current-conducting bracket electrically connected to the rear end of the tractor, a body of insulating material secured atop said bracket, a stationary contact plate secured atop said body in insulated relation to said bracket, means electrically connecting said plate to said ignition system, said bracket including a bifurcated rear end providing a pair of laterally-spaced furcations, a movable contact arm including front and rear ends, current-conducting pivot means pivotally connecting an intermediate portion of said arm to said bracket between said furcations for swinging movement in a vertical plane, a forwardly-directed rod pivoted to a lower portion of said arm below said bracket, a rod guide depending from said bracket and slidably and pivotally receiving said rod, spring means connecting said rod guide and arm to load the lower portion of the latter for downward pivoting movement, a stop adjustable along said rod and engageable with said rod guide to limit downward pivoting of the lower portion of said arm to a selected degree, said arm including a free lower end, located in a selected spaced relation to the ground, said arm including an upper portion above said bracket, a contact member pivoted to said upper portion and depending therefrom, said contact member normally bearing against said body of insulating material rearwardly of said stationary contact plate, said lower end of said arm being engageable with the ground upon predetermined elevation of the front end of the tractor whereby to pivot said lower portion of said arm upwardly and move said contact member into engagement with said stationary contact plate so as to short circuit said ignition system, said pivot means for said arm being connectable thereto at a plurality of locations along said arm, and said contact member being adjustable longitudinally of said upper portion of said arm.

3. An attachment for a tractor for short circuiting the ignition system of the same upon elevation of the tractor front end comprising a current conducting horizontally disposed bracket arranged longitudinally of said tractor adjacent the rear end thereof and having one end secured to the rear end of the tractor, a stationary contact plate positioned upon said bracket inwardly of and spaced from said one end of said bracket and mounted in said bracket in insulated relation with respect to the latter, means electrically connecting said contact plate to said ignition system, an upstanding contact arm positioned adjacent the other end of said bracket, the lower end of said contact arm being normally spaced from the tractor supporting surface, horizontal pivot means secured to the other end and extending transversely of said bracket and pivotally and electrically connecting said contact arms intermediate its ends to said bracket for swinging movement in a vertical plane, and an upstanding contact member arranged longitudinally of said arm adjacent the upper end of said arm and having the upper end pivotally and electrically connected to said arm intermediate the upper end of the latter and said pivot connection of said arm to said bracket and having the lower end normally in bearing engagement with the portion of said bracket intermediate said stationary contact plate and the other end of said bracket, the lower end of said contact arm being engageable with the ground surface upon predetermined elevation of the front end of the tractor.

4. An attachment for a tractor for short circuiting the ignition system of the same upon elevation of the tractor front end comprising a current conducting horizontally disposed bracket arranged longitudinally of said tractor adjacent the rear end thereof and having one end secured to the rear end of said tractor, a stationary contact plate positioned upon said bracket inwardly of and spaced from said one end of said bracket and mounted in said bracket in insulated relation with respect to the latter, means electrically connecting said contact plate to said ignition system, an upstanding contact arm positioned adjacent the other end of said bracket, the lower end of said contact arm being normally spaced from the tractor supporting surface, horizontal pivot means secured to the other end and extending transversely of said bracket and pivotally and electrically connecting said contact arm intermediate its ends to said bracket for swinging movement in a vertical plane, an upstanding contact member arranged longitudinally of said arm adjacent the upper end of said arm and having the upper end pivotally and electrically connected to said arm intermediate the upper end of the latter and said pivot connection of said arm to said bracket and having the lower end normally in bearing engagement with the portion of said bracket intermediate said stationary contact plate and the other end of said bracket, the lower end of said contact arm being engageable with the ground surface upon predetermined elevation of the front end of the tractor, and spring means having one end connected to said contact arm intermediate the lower end and said pivot connection of said arm to said bracket and having the other end operatively connected to said bracket adjacent said one end of said bracket for urging the lower end of said arm toward the ground surface.

5. An attachment for a tractor for short circuiting the ignition system of the same upon elevation of the tractor front end comprising a circuit conducting horizontally disposed bracket arranged longitudinally of said tractor adjacent the rear end thereof and having one end secured to the rear end of said tractor, a stationary contact plate positioned upon said bracket inwardly of and spaced from said one end of said bracket and mounted in said bracket in insulated relation with respect to the latter, means electrically connecting said contact plate to said ignition system, an upstanding contact arm positioned adjacent the other end of said bracket, the lower end of said contact arm being normally spaced from the tractor supporting surface, horizontal pivot means secured to the other end and extending transversely of said bracket and pivotally and electrically connecting said contact arm intermediate its ends to said bracket for swinging movement in a vertical plane, an upstanding contact member arranged longitudinally of said arm adjacent the upper end of said arm and having the upper end pivotally and electrically connected to said arm intermediate the upper end of the latter and said pivot connection of said arm to said bracket and having the lower end normally in bearing engagement with the portion of said bracket intermediate said stationary contact plate and the other end of said bracket, spring means having one end connected to said contact arm intermediate the lower end and said pivot connection of said arm to said bracket and having the other end operatively connected to said bracket adjacent said one end of said bracket for urging the lower end of said arm toward the ground surface, and second spring means having one end connected to said contact member intermediate its upper and lower ends and having the other end connected to said contact arm intermediate said pivot connection of said contact arm to said bracket and said upper end pivotal connection of said contact member to said contact arm for urging the contact member into bearing engagement with the portion of said bracket intermediate said stationary contact plate and the other end of said bracket, the lower end of said contact arm being engageable with the ground surface upon predetermined elevation of the front end of the tractor.

WILBERT P. E. SMITH.

REFERENCES CITED

The following references are of record in the file of this patent:

UNITED STATES PATENTS

| Number | Name | Date |
|---|---|---|
| 1,436,191 | Nichols | Nov. 21, 1922 |
| 1,503,851 | Rodi | Aug. 5, 1924 |
| 1,582,927 | Hentschell et al. | May 4, 1926 |
| 1,713,191 | Penfold | May 14, 1929 |
| 2,456,799 | Smies | Dec. 21, 1948 |

FOREIGN PATENTS

| Number | Country | Date |
|---|---|---|
| 451,666 | France | Feb. 17, 1913 |